United States Patent
Anderson et al.

(10) Patent No.: US 9,690,644 B2
(45) Date of Patent: Jun. 27, 2017

(54) COGNITIVE ANALYSIS FOR HEALING AN IT SYSTEM

(71) Applicant: INTERNATIONAL BUSINESS MACHINES CORPORATION, Armonk, NY (US)

(72) Inventors: Eric M. Anderson, Friendswood, TX (US); Robert A. Davis, Atlanta, GA (US); Christopher J. Dawson, Arlington, VA (US); Patricia Foley, Alvarado, TX (US)

(73) Assignee: International Business Machines Corporation, Armonk, NY (US)

( * ) Notice: Subject to any disclaimer, the term of this patent is extended or adjusted under 35 U.S.C. 154(b) by 121 days.

(21) Appl. No.: 14/534,772

(22) Filed: Nov. 6, 2014

(65) Prior Publication Data
US 2016/0132372 A1 May 12, 2016

(51) Int. Cl.
*G06F 11/00* (2006.01)
*G06F 11/07* (2006.01)

(52) U.S. Cl.
CPC ........ *G06F 11/079* (2013.01); *G06F 11/0709* (2013.01)

(58) Field of Classification Search
USPC .......................................................... 714/26
See application file for complete search history.

(56) References Cited

U.S. PATENT DOCUMENTS

| | | | |
|---|---|---|---|
| 5,247,677 A * | 9/1993 | Welland | G06F 9/4881 718/103 |
| 6,892,317 B1 | 5/2005 | Sampath et al. | |
| 7,225,367 B2 * | 5/2007 | Hashem | G06F 11/0769 379/9.03 |
| 7,349,826 B2 * | 3/2008 | Subramanian | G06F 11/008 455/431 |
| 7,895,071 B2 * | 2/2011 | Khosla | G06F 9/4881 705/7.12 |
| 7,962,797 B2 | 6/2011 | Goldszmidt et al. | |
| 8,468,391 B2 * | 6/2013 | Balani | G06F 11/079 714/37 |
| 8,504,679 B2 | 8/2013 | Spire et al. | |
| 8,600,992 B2 * | 12/2013 | Choi | G06Q 10/06 707/736 |

(Continued)

*Primary Examiner* — Amine Riad
(74) *Attorney, Agent, or Firm* — John R. Pivnichny; Law Office of Jim Boice

(57) ABSTRACT

A cognitive computing hardware system receives an error log from an IT system. The error log comprises a record of errors currently being detected by sensors in the IT system. The cognitive computing hardware system receives an error history log, which describes a history of past errors that have occurred in the IT system. The cognitive computing hardware system receives a listing of alternative IT systems that have been predetermined to have a same functionality as the IT system that is currently experiencing the errors. The cognitive computing hardware system receives a record of real-time events that are external to the IT system, and generates a prioritized set of solutions to heal the IT system, based on the error history log, the listing of alternative IT systems, and the record of real-time events. The cognitive computing hardware system transmits a highest prioritized solution to the IT system.

20 Claims, 3 Drawing Sheets

(56) References Cited

U.S. PATENT DOCUMENTS

| | | | | |
|---|---|---|---|---|
| 8,762,339 B2* | 6/2014 | Bartholomy | ........ | G06F 11/2028 707/640 |
| 9,264,494 B2* | 2/2016 | Factor | ................. | H04L 67/1097 |
| 2005/0188285 A1* | 8/2005 | Fellenstein | ......... | G06F 11/0706 714/54 |
| 2007/0168726 A1* | 7/2007 | Amos | ................. | G06F 11/2252 714/25 |
| 2008/0250264 A1* | 10/2008 | Hourselt | ............... | G06Q 10/06 714/2 |
| 2009/0063387 A1* | 3/2009 | Beaty | ....................... | G06N 5/04 706/50 |
| 2009/0248753 A1* | 10/2009 | Tsai | ................... | G06F 11/0709 |
| 2010/0094677 A1* | 4/2010 | Peltz | ................. | G06Q 30/0283 705/400 |
| 2011/0314331 A1 | 12/2011 | Beach et al. | | |
| 2015/0066782 A1* | 3/2015 | Vainberg | ................ | G06Q 10/20 705/305 |

\* cited by examiner

COGNITIVE ANALYSIS FOR HEALING AN IT SYSTEM

BACKGROUND

The present disclosure relates to the field of computers, and specifically to computer systems that are performing improperly. Still more particularly, the present disclosure relates to healing computer systems that are suffering from performance problems.

An Information Technology (IT) system is a computer system, which performs computations, stores/retrieves data, etc. At times, such IT systems suffer from performance problems, which may be fatal (i.e., the IT system shuts down) or non-fatal (i.e., the IT system continues to function, but at a diminished capacity).

SUMMARY

A method, system, and/or computer program product heals an information technology (IT) system. A cognitive computing hardware system receives an error log from an IT system. The error log comprises a record of errors currently being detected by sensors in the IT system. The cognitive computing hardware system receives an error history log, which describes a history of past errors that have occurred in the IT system. The cognitive computing hardware system receives a listing of alternative IT systems that have been predetermined to have a same functionality as the IT system that is currently experiencing the errors. The cognitive computing hardware system receives a list of incidents and changes from a service management system. The cognitive computing hardware system receives a record of real-time events that are external to the IT system. The cognitive computing hardware system generates a prioritized set of solutions to heal the IT system, based on the error history log, the listing of alternative IT systems, and the record of real-time events, and transmits a highest prioritized solution from the prioritized set of solutions to an implementer system which implements the solution. The cognitive computing hardware system waits for an all-clear from the IT system.

DETAILED DESCRIPTION

Figure 1:
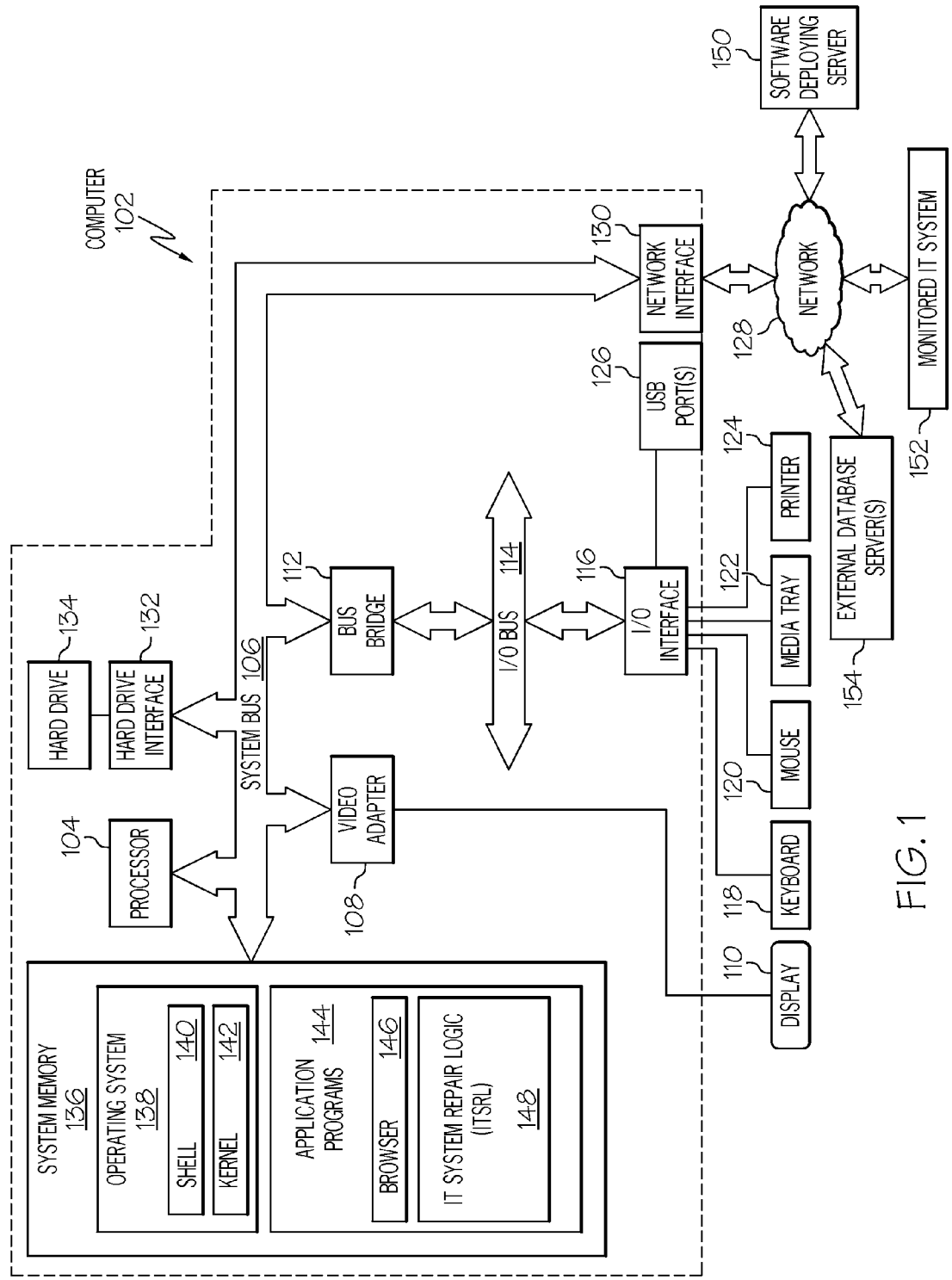
FIG. 1 depicts an exemplary system and network in which the present disclosure may be implemented.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular to FIG. 1, there is depicted a block diagram of an exemplary system and network that may be utilized by and/or in the implementation of the present invention. Note that some or all of the exemplary architecture, including both depicted hardware and software, shown for and within computer 102 may be utilized by software deploying server 150, a monitored information technology (IT) system 152, and/or external database server(s) 154, as well as the IT system 202, Monitoring System 203, Cognitive Computing System 204, Configuration Management System 206, Service Management System 208, Definitive Media Library System 210, Social Media System 212, and/or Knowledge Database System(s) 214 shown in FIG. 2.

Exemplary computer 102 includes a processor 104 that is coupled to a system bus 106. Processor 104 may utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), a printer 124, and external USB port(s) 126. While the format of the ports connected to I/O interface 116 may be any known to those skilled in the art of computer architecture, in one embodiment some or all of these ports are universal serial bus (USB) ports.

As depicted, computer 102 is able to communicate with a software deploying server 150, monitored information technology (IT) system 152, and/or external database server(s) 154 using a network interface 130. Network interface 130 is a hardware network interface, such as a network interface card (NIC), etc. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other computer systems.

Application programs 144 in computer 102's system memory (as well as software deploying server 150's system memory) also include an Information Technology System Repair Logic (ITSRL) 148. ITSRL 148 includes code for implementing the processes described below, including those described in FIGS. 2-3. In one embodiment, computer 102 is able to download ITSRL 148 from software deploying server 150, including in an on-demand basis, wherein the code in ITSRL 148 is not downloaded until needed for execution. Note further that, in one embodiment of the present invention, software deploying server 150 performs all of the functions associated with the present invention (including execution of ITSRL 148), thus freeing computer 102 from having to use its own internal computing resources to execute ITSRL 148.

Note that the hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

Figure 2:
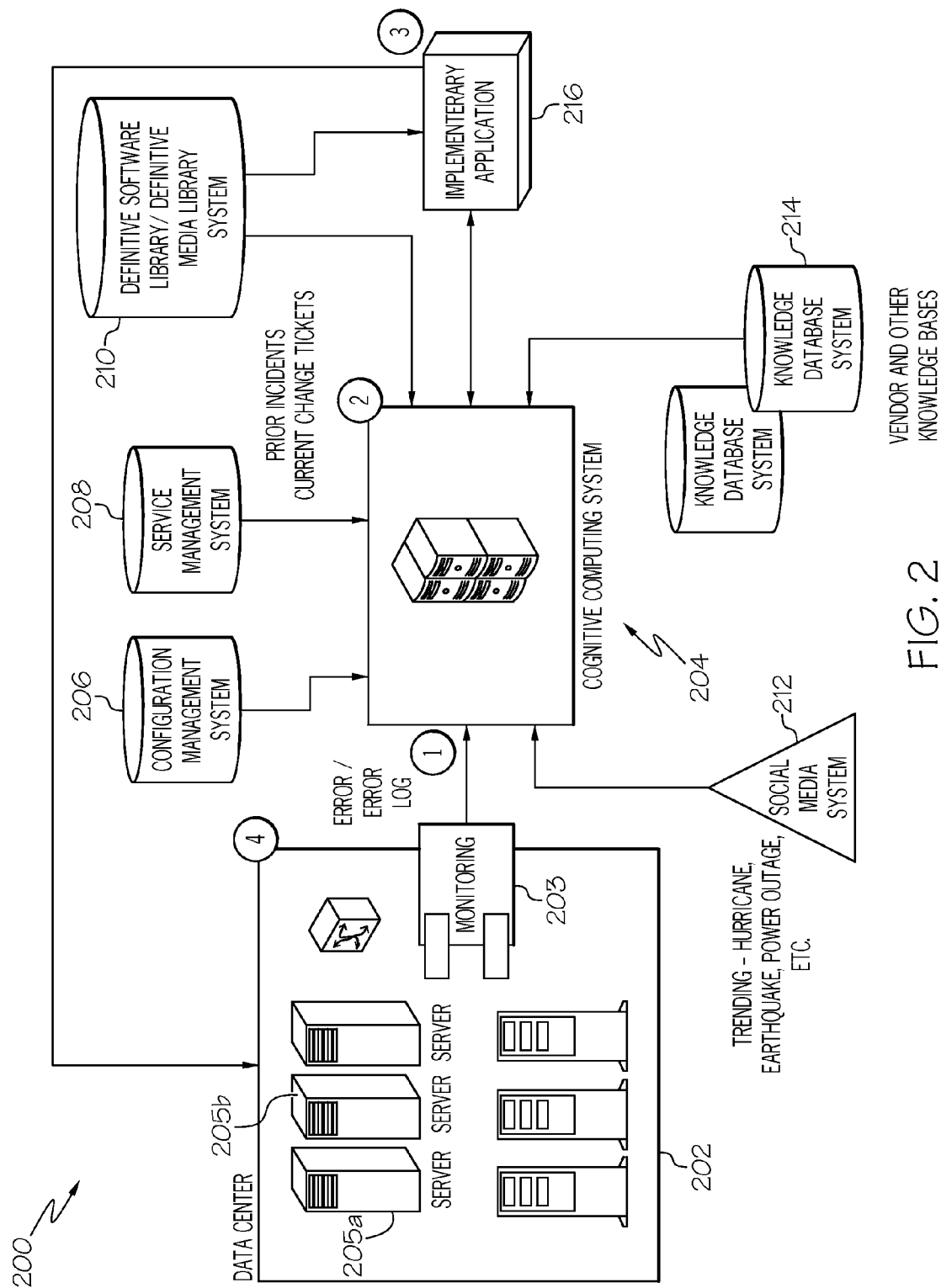
FIG. 2 illustrates an exemplary system and series of steps to heal an information technology (IT) system.

With reference now to FIG. 2, an exemplary system 200 and series of steps 1-4 to heal an information technology (IT) system 202 are presented.

Step 1—Monitoring System 203 detects an issue and sends information to a Cognitive Computing Engine 204.

Monitoring System 203, which may be a monitoring hardware system that monitors the operation of IT system 202 (e.g., monitored IT system 152 shown in FIG. 1), runs a monitoring application that monitors the equipment in the IT system 202, which may be a data center, a network, a server, a blade server chassis, etc. The monitoring application monitors hardware and software. For example, the monitoring application may receive signals from hardware sensors within the IT system 202. Examples of such hardware sensors include, but are not limited to, temperature sensors (e.g., to identify overheating components), power sensors (e.g., to identify a lack of power to the entire IT system 202 or a component thereof), power surge sensors (e.g., to detect a power surge to the entire IT system or a component thereof), etc. Example of software sensors include, but are not limited to, software agents/bots/etc. within the IT system 202 that detect an execution error (e.g., an anomalous result from a computation, an infinite loop, etc.), a data retrieval failure (e.g., a page fault error when attempting to load memory), etc. These errors, hardware or software based, are stored in an error log, at the IT system 202 and/or at the Cognitive Computing System 204.

Step 2—Cognitive Computing System 204 determines corrective action to be implemented and sends to Implementer Application 216.

The Cognitive Computing System 204 (e.g., computer 102 shown in FIG. 1) uses multiple knowledge bases, incident history and on-going changes from the Service Management system, topology information (e.g., from a Configuration Management Database—CMDB), major events (e.g., weather, computer viruses, etc. from social media trending and/or other systems), analysis of the error log, and success of past corrective actions to determine the corrective action for the current error situation and the date and time the action should be deployed. The Cognitive Computing system will also weigh the cost of each corrective action. In one or more embodiments of the present invention, the Cognitive Computing System 204 creates a change ticket in Service Management System. An agent then sends this corrective action and deployment date and time to a deployment application.

In one or more embodiments of the present invention, the incident history of the IT system 202 is a record/log of all software/hardware errors that have occurred within the IT system 202 in the past. In one or more embodiments of the present invention, the record of on-going changes is a record of what changes have been implemented in the IT system 202. These changes may be in response to errors that have occurred within the IT system 202, or they may be changes that have been proactively made to improve the operation of the IT system 202 (e.g., reconfiguring the IT system 202 to improve throughput, installing anti-virus patches to avoid harm from new viruses, etc.). In one embodiment, the record of the errors and/or corrective actions/changes is stored in a Service Management System 208 (e.g., one of the external database server(s) 154 shown in FIG. 1), which in one or more embodiments oversees operations of both the IT system 202 as well as the Cognitive Computing System 204.

In one or more embodiments of the present invention, a Configuration Management Database—CMDB, stored in a Configuration Management System 206 (e.g., one of the external database server(s) 154 shown in FIG. 1), maintains topology information of the IT system 202, as well as other components of the IT system 202. For example, the CMDB includes topology information not only about a component that is suffering an error (e.g., server 205a), but also topology information about other components (e.g., server 205b) that can take over operations of the failing server 205a. The CMDB also maintains topology information about other systems that are external to the IT system 202. Topology information includes, but is not limited to, a description of hardware (e.g., processors, storage devices, etc.), software (e.g., applications and operating systems), interfaces (e.g., network connections), power (e.g., types of power and power loads required by the system), etc. of each system/component/sub-component.

In one or more embodiments of the present invention, a database or other source of information about major events that are external to the IT system 202 are maintained in a Social Media System 212 (e.g., one of the external database server(s) 154 shown in FIG. 1) and/or a Knowledge Database System 214 (e.g., also one of the external database server(s) 154 shown in FIG. 1). For example, assume that the Social Media System 212 is a server (or networked system of servers, storage devices, etc.) that supports a social media website. Assume further that members of a social media group supported by that social media website post entries related to the weather at their locations, political/military events, social unrest at certain locations, etc. This information is then used to determine how to address the error that is occurring within the IT system 202.

For example, assume that IT system 202 is located in City A, and that some or all of the IT system 202 has failed (e.g., due to a power failure). Assume further that there are two backup IT systems that can perform the functions of IT system 202: one IT system is in City B and the other is in City C. However, data mining of posts from the Social Media System 212 reveal that there is an increase in chatter (from the members' postings) about a rolling blackout problem that is currently being experienced in City B. This information is data-mined from the Social Media System 212, thus leading to the decision to roll operations over to the IT system in City C instead of the IT system in City B. Similarly, if current social media postings are discussing a new computer virus that is affecting IT systems in City B, the operations for the IT system in City A will be rolled over to the IT system in City C.

In one or more embodiments of the present invention, an analysis of the error log leads to a decision as to what type of action is to be taken in response to the error/failure that is being experienced in IT system 202. For example, assume that the error log shows that performance of the IT system 202 is being degraded due to an overloading of the resources in the IT system 202. Such an overload may be malicious (e.g., from a Dedicated Denial Of Service—DDOS attack in which malicious bots attempt to access the IT system 202 for the purpose of intentionally overloading the IT system 202 and its resources), or innocuous (e.g., from too many legitimate users attempting to access the IT system 202 at the same time). In either scenario, the error log reveals 1) that the overloading is occurring, and 2) the source of the demand (malicious or non-malicious). Based on this information, the Cognitive Computing System 204 will retrieve a solution from the Definitive Media Library System 210 (e.g., one of the external database server(s) 154 shown in FIG. 1) for implementation by the Implementer Application 216. For example, services may be rolled over to another IT system while IT system 202 is being repaired by an anti-virus patch.

In one or more embodiments of the present invention, the success of past corrective actions is analyzed in order to determine the corrective action for the current error situation, as well as the date and time that the action should be deployed. For example, assume that a knowledge database from the Knowledge Database System(s) 214 shows that a particular action (e.g., performing a hard reboot of IT system 202, in which power is removed from the IT system 202) has effectively cured the current problem with IT system 202 99% of the time in the past. Assume further that the knowledge database from the Knowledge Database System(s) 214 reveals that merely restarting the IT system 202 has effectively cured the current problem with IT system 202 only 75% of the time in the past. This log/record thus leads the Cognitive Computing System 204 to direct the Implementer Application 216 to direct the IT system 202 to undergo a hard reboot. In one or more embodiments, such directives are recorded/mirrored as a change ticket in the Service Management System 208. An agent then sends such directives (corrective actions) from the Cognitive Computing System 204 to the Implementer Application 216 at a date and time deemed best suited by the Cognitive Computing System 204. This date/time is based on various rules within the Service Management System 208, such as when the IT system 202 is scheduled to be taken offline for service anyway, when workloads on the IT system 202 and/or other IT (backup) systems are predicted to be reduced, etc.

Step 3—Implementer Application 216 implements the corrective action as requested and sends implementation status to the Cognitive Computing System 204.

A deployment application/agent such as Implementer Application 216 receives the best solution to the current problem being experienced by the IT system 202 from the Cognitive Computing System 204. Implementer Application 216 interfaces with the Definitive Media Library System 210 to deploy current versions, patches, etc. of corrective software, and/or reboots the IT system 202. In an embodiment of the present invention, the deployment agent within the Implementer Application 216 notifies the Cognitive Computing System 204 when the corrective action has been deployed to the IT system 202.

Step 4—Cognitive Computing System 204 receives "all clear" from Monitoring system.

Cognitive Computing System 204 will expect a clearing code from the IT system 202 once the action has been implemented. If this is received, the Cognitive Computing System 204 notes this for use in future decisions by storing it in the Definitive Media Library System 210 and/or the Service Management System 208. If the clearing signal from the IT system 202 is not received, then the Cognitive Computing System 202 prepares a different action, and notes the failure of this first action for use in future decisions.

While FIG. 2 presented an overview of one or more exemplary embodiments of the present invention, presented now are one or more exemplary implementations of the present invention.

Example 1—Server Down

Step 1—The monitoring application being run by the Monitoring System 203 detects that an application on a server in the IT system 202 is non-responsive. The monitoring application sends a notification to the Cognitive Computing System 204.

Step 2—The Cognitive Computing System 204 has the IP address of the non-responding server and looks it up in the CMDB in the Configuration Management System 206. The Cognitive Computing System 204 also inspects the CMDB to see if any active changes (reflected by a Configuration Item—CI in the CMDB) include the failing server. The Cognitive Computing System 204 looks at past incidents involving this CI as well. The Cognitive Computing System 204 uses the CMDB to determine what applications or other CIs are running on that server. The Cognitive Computing System 204 checks social media and weather forecasts for weather conditions and other weather related-events in the location of the data center. The Cognitive Computing System 204 also checks social media and trending items for virus and other activity that may be happening. The Cognitive Computing System 204 may have an "Implementer Application" ping or attempt to pull additional information from the server or CI. In this case (application down), the Cognitive Computing System 204 determines that the server is "pingable" (can be accessed), but the application is not running and/or disk space on the server is nearing capacity. Based on previous incidents, there were log files that could be cleared to free up space, and the application restarted. The Cognitive Computing System 204 determines two actions are required: (1) deleting old log files, and (2) re-starting the application. The Cognitive Computing System 204 determines that these actions can be taken immediately, creates an e-change in the Service Management System 208, and sends the 2 correction actions to the Implementer Application 216 to act on immediately.

Step 3—The Implementer Application 216 receives the actions to be taken. The Implementer Application 216 removes the old log files from the server, and then re-starts the application. The Implementer Application 216 then notifies the Cognitive Computing System 204 of the successful completion. If the Implementer Application 216 is not successful, it notifies the Cognitive Computing System 204 of failure of one or more of the actions. The Cognitive Computing System 204 may then calculate an alternative action to be taken, and send to the Implementer Application 216.

Step 4—The Cognitive Computing System 204 receives an "all clear" from the monitoring application running on the Monitoring System 203, assuming that there are no more errors coming from the application that had been down. If the "all clear" was not received and the monitoring application was still reporting that the application on the server was down, the Cognitive Computing System 204 would note that the solution did not work, and would calculate another corrective action for the Implementer Application 216 to take.

Example 2—a Monitoring System Detects that a Java Virtual Machine (JVM) is No Longer Responding Step 1—The Monitoring System 203 gathers the error code and JVM logs and sends this information to the Cognitive Computing System 204.

Step 2—The Cognitive Computing System 204 analyzes the data and provides a prioritized list of possible resolutions. The Cognitive Computing System 204 analyzes the possible resolutions taking into account cost, effort to deploy, change windows, and other factors. In this example, the Cognitive Computing System 204 determines that the best course of action is to move the workload of the non-responsive JVM to a JVM in another data center. More specifically, the Cognitive Computer System 204 recommends a data center in New York over a data center in Dallas, as the Cognitive Computer System is able to take real-time weather forecasts into account. (In this example, the real-time weather forecast indicates severe storms which may cause power outages are approaching Dallas.)

Step 3—The JVM is provisioned in the New York data center using an automated tool, and the workload is redirected there.

Step 4—The corrective system (e.g., Monitoring System 203) checks to determine whether or not the solution solved the problem, checks whether the weather information was accurate, and/or records this information to improve decision making in the future. Thus, the operations are migrated and the JVM restored.

Figure 3:
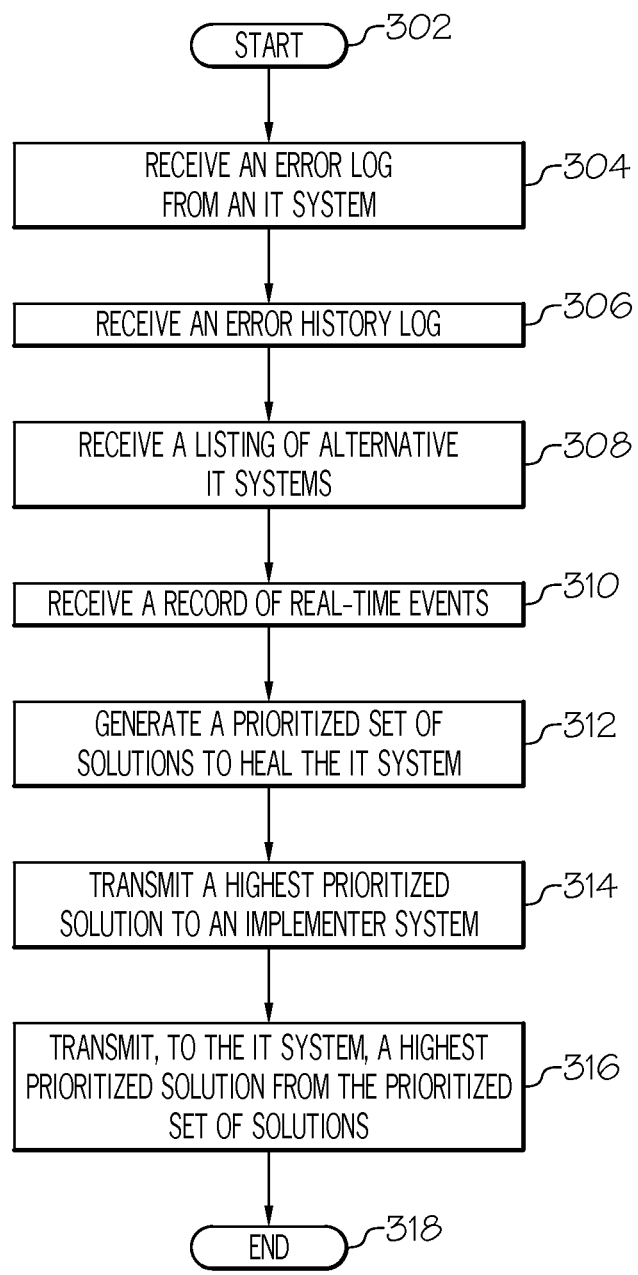
FIG. 3 is a high level flow chart of one or more steps performed by one or more hardware devices and/or processors to heal an IT system.

With reference now to FIG. 3, a high level flow chart of one or more steps performed by one or more hardware devices and/or processors to heal an Information Technology (IT) system is presented.

After initiator block 302, a cognitive computing hardware system (e.g., Cognitive Computing System 204 shown in FIG. 2) receives an error log from an IT system (e.g., IT system 202 shown in FIG. 2), as described in block 304. This error log contains a record of one or more errors currently being detected by at least one sensor in the IT system. In an embodiment, such sensors are hardware devices that measure physical features (e.g., heat, power, fan speed, etc.) of components in the IT system. In an embodiment, such sensors are software-based, and measure instruction throughput of processors in the IT system, accesses to storage devices, etc.

As described in block 306, the cognitive computing hardware system receives an error history log that describes a history of past errors that have occurred in the IT system.

As described in block 308, the cognitive computing hardware system receives a listing of alternative IT systems that have been predetermined to have a same functionality as the IT system that is currently experiencing the one or more errors. As discussed above, these alternative IT systems may be complete IT systems (e.g., multiple servers, storage devices, etc.) or they may be a single component (e.g. a single processor, server, hard drive, etc.) within the IT system that is at issue.

As described in block 310, the cognitive computing hardware system receives a record of real-time events from at least one external event server. These real-time events are external to the IT system. For example, an external event server may be a server that provides weather reports, or a social media server that provides postings from a social media circle, etc. The real-time events are external to the IT system. That is, the real-time events are not faults/issues that occur within the IT system (e.g., a page swap error, a virtual machine failure, a failed processor, etc.), but rather are external events, such as weather events, overall power outages, political unrest, military actions, etc.

As described in block 312, the cognitive computing hardware system generates a prioritized set of solutions to heal the IT system. This prioritized set of solutions is prioritized based on the error history log, the listing of alternative IT systems, and the record of real-time events. For example, assume that a solution is to restart the IT system. The error history log may report that this was effective 50% of the time in the past. The listing of alternative IT systems may report that there are 2 other IT systems that are designed to have the same capabilities of the problem IT system. A record of real-time events may indicate that both of the other IT systems are in cities that are currently experiencing rolling blackouts, which have a 75% chance of disabling the 2 other IT systems (i.e., there is a 25% chance that the 2 other IT systems will be able to handle the workload from the IT system that is in failure). Thus, the system would deem that the best solution is to simply restart the erroneous IT system, even though the chance of success is only 50%. Similarly, if all other factors are the same except that the error history log reports that restarting the IT system was effective only 20% of the time in the past, then the best chance of success in overcoming the failure of the IT system would be to route the work to the other 2 IT systems, even though their chance of success is only 25% (which is still better than the 20% chance of success by restarting the IT system that is having problems).

As depicted in block 314, the highest prioritized solution is sent to an implementer system, which in one embodiment is part of the cognitive computing system 204 shown in FIG. 2. This implementer system is architected to implement the highest prioritized solution in the IT system (e.g., by uploading the highest prioritized solution to the errant IT system).

As described in block 316, the highest prioritized solution (based on the factors described above) from the prioritized set of solutions is then transmitted, via the implementer system, from the cognitive computing hardware system to the IT system that is having problems.

In various embodiments of the present invention, the prioritized set of solutions includes multiple solutions that are weighted by their overall chance of success. For example, based on the parameters used in block 312, one solution may have a 90% chance of successfully correcting the problem, the next solution may have an 85% chance of success, the next solution may have an 80% chance of success, etc. The solution with the highest chance of success is deemed to be the highest prioritized solution.

The flow chart ends at terminator block 318.

In an embodiment of the present invention, the solutions are further prioritized based on a cost of implementing each of the solutions. Such costs may be monetary, time-based, reputation-based, manpower-based, resource degradation-based, security-based, etc.

For example, assume that it would cost $100 to implement one solution and $50 to implement another solution. The choice as to which solution to implement would likely be to select the $50 solution.

However, other costs/factors may be utilized. For example, assume that switching operations from the failing IT system to a backup system would take 10 minutes, while simply rebooting the failing IT system (assuming that this corrects the problem the same percentage of cases as rerouting the work to the backup system) would take only 5 minutes. As the latter option only "costs" 5 minutes, the choice would be to reboot the failing IT system.

In another example, the decision to select a particular solution may be reputation-based. For example, assume that an IT system can be rebooted to correct the problem, but doing so would take the system off-line for the third time that day. Doing so would impact on the reputation of the provider of the IT system, since the IT system would develop a reputation of being unreliable. Thus, even though it may be more costly in money and resource usage to rollover operations to a backup system, this action may be taken if a predefined rule within the Cognitive Computing System 204 determines that it is justified, in order to protect the reputation of the IT system.

In another example, the decision regarding which solution to use may be manpower-based. For example, assume that 0.5 man-hours are required to implement one solution (e.g., rebooting the IT system), while 2.0 man-hours are required to roll-over operations to a backup system. Assume further, however, that the only person who can reboot the IT system is not available until the next day. Thus, the decision is weighted according to 1) what persons are needed, 2) when they will be available, and 3) how long it will take them to perform each solution. These factors are weighted by one or more rules within the Cognitive Computing System 204 to select the optimal solution.

In another example, the decision about which solution to use may be resource degradation-based. For example, assume that rolling over the work from the error-laden IT system to a backup system will cause the backup system to decrease in efficiency, due to the new workload. If the backup system is primarily used in a mission-critical operation (e.g., monitoring operation of a refinery), then loading it with new operations (e.g., executing less important operations such as tracking vacation time for employees) from the failing IT system may be deemed unacceptable by one or more rules within the Cognitive Computing System 204.

In another example, the decision to use a particular solution to the failure in the IT system may be security-based. For example, assume that the IT system is used to track sensitive corporate information. If the backup IT system that could be used is non-secure, then it cannot be used. Rather, the IT system that is failing must be repaired (restarted, reconfigured, etc.), since use of the non-secure system is unacceptable.

As described herein, in an embodiment of the present invention, the cognitive computing hardware system receives listings of alternative IT systems from a configuration management database (CMDB) server, such as the Configuration Management System 206 shown in FIG. 2. This CMDB allows the cognitive computing hardware system to "know" what resources are available to correct the problem being experienced by the IT system 202.

In an embodiment of the present invention, the cognitive computing hardware system receives a clearing code from the IT system. This clearing code indicates that the highest prioritized solution from the prioritized set of solutions healed the errors currently being detected in the IT system. Thereafter and in response to the cognitive computing hardware system receiving the clearing code, the highest prioritized solution is added to a log of successful solutions for healing errors in the IT system. For example, if a particular solution was successful in correcting the problem to IT system 202, that solution will be added to the Definitive Media Library System 210 shown in FIG. 2.

In an embodiment of the present invention, the cognitive computing hardware system receives a failure code from the IT system. This failure code indicates that the highest prioritized solution from the prioritized set of solutions failed to heal the errors currently occurring in the IT system (as detected by sensors, either hardware or software, in the IT system). In response to the cognitive computing hardware system receiving the failure code, a next highest prioritized solution from the prioritized set of solutions is transmitted to the IT system. That is, the Definitive Media Library System 210 shown in FIG. 2 has a prioritized (according to their weighted superiority in correcting the issue with the IT system 202) listing of solutions. If the "best" (highest rated/prioritized) solution does not fix the problem, then the next best/highest rated/prioritized solution is used.

In an embodiment of the present invention, the cognitive computing hardware system data mines a social media database to identify the record of real-time events, as described herein.

In an embodiment of the present invention, the cognitive computing hardware system data mines a weather reporting database to identify the record of real-time events, as described herein.

In an embodiment of the present invention, the cognitive computing hardware system data mines a political news reporting website to identify the record of real-time events (e.g., civil unrest, military actions, government changes, etc.), in order to determine which IT system is optimal based on current political conditions. For example, a news reporting website may report that a particular government has passed new laws relaxing privacy of databases. Thus, IT systems in that political jurisdiction are no longer deemed appropriate resources for storing higher confidential data.

In an embodiment of the present invention, the cognitive computing hardware system data mines a power grid database to identify the record of real-time events. For example, if a power company's records show that a particular geographic region has a history of losing power once every week, then an IT system within that region would not be deemed appropriate as a failover system for mission critical operations performed by the IT system that is currently having problems.

In one or more embodiments, the present invention uses multiple monitoring tools to monitor equipment in IT systems, such as data centers. The monitoring system (e.g., Monitoring System 203 in FIG. 2) uses an interface to a cognitive computing system (e.g., Cognitive Computing System 204) to feed events and information. The cognitive computing system interfaces with the Service Management System 206, which may contain a CMDB, knowledge databases in Knowledge Database System(s) 214, trends in social media (from Social Media System 212), real time information (weather, news, etc.) from other Knowledge Database System(s) 214, etc. Success of past corrective actions is used to determine the cause of the error and the corrective action needed, as well as the date and time the action should be implemented. For example, if a certain solution was designed to solve a particular software problem, and implementing this certain solution brings the IT system back to normal operations, then an assumption is made that the problem with the IT system was with the particular software problem.

As described herein, the corrective actions are prioritized into time/cost/effort/risk—with standard change, low risk, automated solutions being prioritized. The Implementer Application 216 implements the action and notifies the cognitive computer system of implementation success or failure.

If there is implementation success, the cognitive computing system will expect an OK/Clear signal from the monitoring application. If an error signal is still received, the process starts over, but the cognitive computing system notes that the first solution did not work for future reference during the analysis phase of future errors.

If there is an implementation failure, the cognitive computing system will either have the implementer application try again, or calculate and send a different corrective action. The cognitive computing system will store the failure of the first solution to use in future analysis of similar events.

Note that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A method for healing an information technology (IT) system, the method comprising:
    receiving, by a cognitive computing hardware system, an error log from an IT system, wherein the error log comprises a record of one or more errors currently being detected by at least one sensor in the IT system;
    receiving, by the cognitive computing hardware system, an error history log, wherein the error history log describes a history of past errors that have occurred in the IT system;
    receiving, by the cognitive computing hardware system, a listing of alternative IT systems, wherein the alternative IT systems have been predetermined to have a same functionality as the IT system that is currently experiencing the one or more errors;
    receiving, by the cognitive computing hardware system, a list of incidents and changes that have occurred on the IT system;
    receiving, by the cognitive computing hardware system, a record of real-time events from at least one external event server, wherein the real-time events are external to the IT system, and wherein the real-time events impact a performance of the alternative IT systems;
    generating, by the cognitive computing hardware system, a prioritized set of solutions to heal the IT system, wherein solutions from the prioritized set of solutions are prioritized based on the error history log, the listing of alternative IT systems, and the record of real-time events;
    transmitting, from the cognitive computing hardware system to the IT system via an implementer system, a highest prioritized solution from the prioritized set of solutions, wherein the highest prioritized solution has a greater probability of healing the one or more errors, that are in the error history log and that are detected by said at least one sensor in the IT system, than any other solution, from the prioritized set of solutions, based on the error history log, the listing of alternative IT systems, and the record of real-time events; and
    implementing, by the implementer system, the highest prioritized solution from the prioritized set of solutions in order to heal the one or more errors currently being detected by said at least one sensor in the IT system.

2. The method of claim 1, further comprising:
    further prioritizing the solutions based on a cost of implementing each of the solutions wherein the cost is based on a combination of a monetary cost of implementing a particular solution to resolve the one or more errors currently being detected by said at least one sensor in the IT system, time utilized to implement the particular solution, a decrease in a reputation of the IT system caused by implementing the particular solution, an amount of manpower required to implement the particular solution, a wait time required until a particular person is available to implement the particular solution, and a degradation of functionality of other IT systems used to back up the IT system in response to implementing the particular solution.

3. The method of claim 1, further comprising:
    determining, by the cognitive computing hardware system, that the highest prioritized solution failed to heal the one or more errors currently being detected by said at least one sensor in the IT system; and
    in response to determining that the highest prioritized solution failed to heal the one or more errors currently being detected by said at least one sensor in the IT system, implementing, by the cognitive computing hardware system, a next highest prioritized solution from the prioritized set of solutions in the IT system.

4. The method of claim 1, further comprising:
    receiving, by the cognitive computing hardware system, the listing of alternative IT systems from a configuration management database (CMDB) server.

5. The method of claim 1, further comprising:
    receiving, by the cognitive computing hardware system, a clearing code from the IT system, wherein the clearing code indicates that the highest prioritized solution from the prioritized set of solutions healed said one or more errors currently being detected by said at least one sensor in the IT system; and
    in response to receiving the clearing code, adding, by the cognitive computing hardware system, the highest prioritized solution to a log of successful solutions for healing errors in the IT system.

6. The method of claim 1, further comprising:
    receiving, by the cognitive computing hardware system, a failure code from the IT system, wherein the failure code indicates that the highest prioritized solution from the prioritized set of solutions failed to heal said one or more errors currently being detected by said at least one sensor in the IT system; and
    in response to receiving the failure code, transmitting, by the cognitive computing hardware system, a next highest prioritized solution from the prioritized set of solutions to the IT system.

7. The method of claim 1, further comprising:
    data mining, by the cognitive computing hardware system, a social media database to identify the record of real-time events.

8. The method of claim 1, further comprising:
    data mining, by the cognitive computing hardware system, a weather reporting database to identify the record of real-time events.

9. The method of claim 1, further comprising:
    data mining, by the cognitive computing hardware system, a political news reporting website to identify the record of real-time events.

10. The method of claim 1, further comprising:
data mining, by the cognitive computing hardware system, a power grid database to identify the record of real-time events.

11. A computer program product for healing an Information Technology (IT) system, wherein said computer program product comprises a non-transitory computer readable storage medium having program code stored thereon, and wherein said program code is read and executed by a processor to perform a method comprising:
receiving an error log from an IT system, wherein the error log comprises a record of one or more errors currently being detected by at least one sensor in the IT system;
receiving an error history log, wherein the error history log describes a history of past errors that have occurred in the IT system;
receiving a listing of alternative IT systems from a configuration management database (CMDB) server, wherein the alternative IT systems have been predetermined to have a same functionality as the IT system that is currently experiencing the one or more errors;
receiving, by the cognitive computing hardware system, a list of incidents and changes that have occurred on the IT system;
receiving a record of real-time events from at least one external event server, wherein the real-time events are external to the IT system, and wherein the real-time events impact a performance of the alternative IT systems;
generating a prioritized set of solutions to heal the IT system, wherein solutions from the prioritized set of solutions are prioritized based on the error history log, the listing of alternative IT systems, and the record of real-time events; and
transmitting, to the IT system via an implementer system, a highest prioritized solution from the prioritized set of solutions, wherein the highest prioritized solution has a greater probability of healing the one or more errors, that are in the error history log and that are detected by said at least one sensor in the IT system, than any other solution, from the prioritized set of solutions, based on the error history log, the listing of alternative IT systems, and the record of real-time events; and
implementing the highest prioritized solution from the prioritized set of solutions in order to heal the one or more errors currently being detected by said at least one sensor in the IT system.

12. The computer program product of claim 11, wherein the method further comprises:
further prioritizing the solutions based on a cost of implementing each of the solutions, wherein the cost is a combination of a monetary cost and a degradation of functionality of other IT systems.

13. The computer program product of claim 11, wherein the method further comprises:
receiving a clearing code from the IT system, wherein the clearing code indicates that the highest prioritized solution from the prioritized set of solutions healed said one or more errors currently being detected by said at least one sensor in the IT system; and
in response to receiving the clearing code, adding the highest prioritized solution to a log of successful solutions for healing errors in the IT system.

14. The computer program product of claim 11, wherein the method further comprises:
receiving a failure code from the IT system, wherein the failure code indicates that the highest prioritized solution from the prioritized set of solutions failed to heal said one or more errors currently being detected by said at least one sensor in the IT system; and
in response to the cognitive computing hardware system receiving the failure code, transmitting a next highest prioritized solution from the prioritized set of solutions to the IT system.

15. The computer program product of claim 11, wherein the method further comprises:
data mining a social media database, a weather reporting database, and a political news reporting website to identify the record of real-time events.

16. A system comprising:
a hardware processor, a computer readable memory, and a computer readable storage media;
first program instructions to receive an error log from an IT system, wherein the error log comprises a record of one or more errors currently being detected by at least one sensor in the IT system;
second program instructions to receive an error history log, wherein the error history log describes a history of past errors that have occurred in the IT system;
third program instructions to receive a listing of alternative IT systems from a configuration management database (CMDB) server, wherein the alternative IT systems have been predetermined to have a same functionality as the IT system that is currently experiencing the one or more errors;
fourth program instructions to receive a list of incidents and changes that have occurred on the IT system;
fifth program instructions to receive a record of real-time events from at least one external event server, wherein the real-time events are external to the IT system, and wherein the real-time events impact a performance of the alternative IT systems;
sixth program instructions to generate a prioritized set of solutions to heal the IT system, wherein solutions from the prioritized set of solutions are prioritized based on the error history log, the listing of alternative IT systems, and the record of real-time events; and
seventh program instructions to transmit, to the IT system via an implementer system, a highest prioritized solution from the prioritized set of solutions, wherein the highest prioritized solution has a greater probability of healing the one or more errors, that are in the error history log and that are detected by said at least one sensor in the IT system, than any other solution, from the prioritized set of solutions, based on the error history log, the listing of alternative IT systems, and the record of real-time events; and
eighth program instructions to implement, by the implementer system, the highest prioritized solution from the prioritized set of solutions in order to heal the one or more errors currently being detected by said at least one sensor in the IT system; and wherein
the first, second, third, fourth, fifth, sixth, seventh, and eighth program instructions are stored on the computer readable storage media for execution by the hardware processor via the computer readable memory.

17. The system of claim 16, further comprising:
ninth program instructions to further prioritize the solutions based on a cost of implementing each of the solutions, wherein the cost is a combination of a monetary cost and a degradation of functionality of other IT systems; and wherein the ninth program instructions are stored on the computer readable storage media for execution by the hardware processor via the computer readable memory.

18. The system of claim 16, further comprising:
ninth program instructions to receive a clearing code from the IT system, wherein the clearing code indicates that the highest prioritized solution from the prioritized set of solutions healed said one or more errors currently being detected by said at least one sensor in the IT system; and
tenth program instructions to, in response to receiving the clearing code, add the highest prioritized solution to a log of successful solutions for healing errors in the IT system; and wherein
the ninth and tenth program instructions are stored on the computer readable storage media for execution by the hardware processor via the computer readable memory.

19. The system of claim 16, further comprising:
ninth program instructions to receive a failure code from the IT system, wherein the failure code indicates that the highest prioritized solution from the prioritized set of solutions failed to heal said one or more errors currently being detected by said at least one sensor in the IT system; and
tenth program instructions to, in response to the cognitive computing hardware system receiving the failure code, transmit a next highest prioritized solution from the prioritized set of solutions to the IT system; and wherein
the ninth and tenth program instructions are stored on the computer readable storage media for execution by the hardware processor via the computer readable memory.

20. The system of claim 16, further comprising:
ninth program instructions to data mine a social media database, a weather reporting database, and a political news reporting website to identify the record of real-time events; and wherein
the ninth program instructions are stored on the computer readable storage media for execution by the hardware processor via the computer readable memory.

* * * * *